United States Patent
Kondo et al.

[15] 3,640,709
[45] Feb. 8, 1972

[54] ELECTROPHOTOGRAPHIC COPYING MATERIAL AND PROCESS OF PRODUCING THEREOF

[72] Inventors: Kishichiro Kondo; Hiroo Iwata, both of Aichi-ken; Nario Yamaguchi; Sakae Shimizu; Kazuo Tubuko, all of Tokyo, all of Japan

[73] Assignees: Kabushiki Kaisha Ricoh; Toa Gosei Chemical Industry Co., Ltd., Tokyo, Japan

[22] Filed: Dec. 23, 1968

[21] Appl. No.: 786,417

[30] Foreign Application Priority Data

Dec. 27, 1967 Japan.................................42/83738

[52] U.S. Cl..............................96/1.5, 96/1.8, 260/80.81, 260/80.8, 260/78.5 BB
[51] Int. Cl.....................G03g 5/00, G03g 7/00, H01c 13/00
[58] Field of Search...............................96/1.5, 1.8; 117/218

[56] References Cited

UNITED STATES PATENTS

| | | |
|---|---|---|
| 3,121,006 | 2/1964 | Middleton et al............................96/1 |
| 3,159,483 | 12/1964 | Behmenburg et al.........................96/1 |
| 3,192,043 | 6/1965 | Metcalfe et al..............................96/1 |
| 3,245,786 | 4/1966 | Cassiers et al................................96/1 |

Primary Examiner—George F. Lesmes
Assistant Examiner—M. B. Wittenberg
Attorney—Woodhams, Blanchard and Flynn

[57] ABSTRACT

An electrophotographic copying material comprising a support and a light-sensitive or photoconductive layer formed on one surface of said support and comprising a resinous binder. The photoconductive layer contains a photoconductive substance and is formed by dispersing said photoconductive substance in a water-emulsified resinous binder. The resinous binder is prepared by emulsion polymerization, in water, of at least one vinyl monomer in the presence of at least one acidic compound selected from the group consisting of an aliphatic carboxylic acid, an aromatic carboxylic acid, an acid anhydride of said carboxylic acids, an alicyclic compound having a carboxyl radical, a natural resin containing a resin acid and having a high electric resistance and a vinyl polymer having a carboxyl radical. The resultant photoconductive layer-forming solution is coated on said support and then the coated support is dried.

3 Claims, No Drawings

ELECTROPHOTOGRAPHIC COPYING MATERIAL AND PROCESS OF PRODUCING THEREOF

BACKGROUND OF THE INVENTION

1. Field of the Invention

The present invention relates to an electrophotographic copying material and its manufacturing method.

2. Description of the Prior Art

The electrophotographic copying materials in the prior art were manufactured by such a method wherein a metallic plate or a specific paper whose back had been processed for electric conductivity was used as a support while a so-called light-sensitive or photoconductive layer forming solution obtained by dispersing photoconductive substance in a binder solution prepared by dissolving a resin in an organic solvent was applied onto the surface of said support and dried. In the method of the prior art, however, a water-soluble resin was not generally used for the reasons that it does not serve to provide the photoconductive layer formed on the support with such electrostatic characteristics—especially, high electric resistance—as are required for photoconductive layers. Accordingly, it was considered particularly advisable to use a natural or synthetic resin which would be soluble only in an organic solvent and would not hamper the electrostatic characteristics of the photoconductive layer formed on a support as stated above. However, when such a resin which is soluble only in an organic solvent was employed for the aforesaid purpose, it was necessary to prepare the binder by dissolving said resin in a large quantity of an organic solvent because of the general requirement for homogenization of the dispersion of the photoconductive substance in said binder. As a result, there were various drawbacks in the manufacturing of electrophotographic copying material in the prior art, such as:

a. It was generally required to employ expensive organic solvents so that it was necessary to recover these solvents during the manufacturing process.

b. Most of said organic solvents are inflammable and involve a risk of explosion so that preventive measures were required therefor.

c. There are many organic solvents which are hazardous to the human body so that protective measures against their effect were also required.

d. It was required to provide expensive special measures for the coating device to form a photoconductive layer on a support.

e. An air-knife being unusable as a coating-head, high-speed coating was impractical.

In view of the fact that the above-mentioned drawbacks may be absolutely disregarded if the resin to be used for a binder is water-emulsive or water-dispersive, there have been proposed a variety of resins of the water-emulsive or water-dispersive types. However, any copying material produced under these proposals exhibit such drawbacks that its electrostatic characteristics, for example, the charged potential when the electrostatic charge was impressed on a photoconductive layer by corona discharge became low, and that the decay of electric potential, i.e., the dark-decay when said material was left in a dark place after being charged, was remarkable, and accordingly, the same have proved quite unsatisfactory to be put to practical use.

SUMMARY OF THE INVENTION

It is, therefore, an object of the present invention to provide an electrophotographic copying material which is free from the aforesaid drawbacks of electrophotographic copying material manufactured by employing water-emulsified resinous binders in the prior art.

Another object of the present invention is to provide a water-emulsified resinous binder which is most suitable for forming a photoconductive layer having superior electrostatic characteristics as an electrophotographic copying material.

It is also another object of the present invention to provide an electrophotographic copying material which can be produced economically while eliminating such drawbacks as are involved in the manufacturing process of the copying material in the prior art.

In brief, an electrophotographic copying material in the present invention is obtained by the following process: a water-emulsified resinous binder is prepared by emulsion polymerization, in water, of at least one vinyl monomer in the presence of at least one acidic compound; the water-emulsified resinous binder thus obtained is dispersed therein, either independently or together with a sensitizer, with a photoconductive substance; and the surface of a support is coated with the resultant dispersion and dried thereafter. More specifically, in the present invention, as for the water-emulsified resinous binder to form a photoconductive layer, one member selected from the group comprising the following emulsions A–D is employed.

EMULSION A

An emulsion, which is prepared by emulsion polymerization, in water, of at least one vinyl monomer in the presence of at least one acid selected from the group consisting of aliphatic carboxylic acids and aromatic carboxylic acids.

EMULSION B

An emulsion, which is prepared by emulsion polymerization, in water, of at least one vinyl monomer in the presence of at least one acid selected from the group consisting of alicyclic compounds having a carboxyl radical.

EMULSION C

An emulsion, which is prepared by emulsion polymerization, in water, of at least one vinyl monomer in the presence of at least one acid selected from the group consisting of natural resins having resin acid and an electric resistance of at least $10^{11}\Omega$ cm.

EMULSION D

An emulsion, which is prepared by emulsion polymerization, in water, of at least one vinyl monomer in the presence of at least one vinyl copolymer having a carboxyl radical and an electric resistance of at least $10^{11}\Omega$ cm.

It may also be considered applicable for the aforesaid purpose to use a water-emulsified resinous binder which is prepared by emulsion polymerization, in water, by the use of a known surface-active agent such as anionic, nonionic or cationic type, but, in fact, a photoconductive layer formed by employing an emulsion obtained thereby has too low an electric resistance (less than $10^{11}\Omega$ cm.) to provide a sufficient electrostatic light sensitivity and therefore can not be of practical use.

In the present invention, however, when the emulsion polymerization of vinyl monomer or monomers as stated above is carried out, a very small amount of the aforesaid surface active agent is applicable with the aforesaid acidic compound as an emulsifier. The desirable amount of such a surface-active agent which is added in the emulsion polymerization reaction with said acidic compound is in the range of from 0.05 to 0.1 percent by weight per the total amount of polymeric monomers such as vinyl monomers.

With respect to the acidic compound, i.e., an aliphatic carboxylic acid, an aromatic carboxylic acid and an acid anhydride of said carboxylic acids, to be employed for the aforesaid emulsion A, the many applicable acids are enumerated as follows:

Aliphatic saturated monocarboxylic acid:

caproic acid, heptanoic acid, caprylic acid, pelargonic acid, capric acid, n-undecylenic acid, lauric acid, n-tridecylenic acid, myristic acid, n-pentadecylenic acid, palmitic acid, margaric acid, stearic acid, n-nonadecylenic acid, arachidic acid, n-heneicosanoic acid, behenic acid, n-tricosanoic acid, lignoceric acid, n-pentacosanoic acid, ceratic acid, n-heptacosanoic acid, montanic acid, n-nonacosanoic acid, melissic acid, 3.1-hentriacontanoic acid, n-dotriacontanoic acid, n-tetratriacontanoic acid, ceroplastic acid, n-hexatriacontanoic acid, n-octatriacontanoic acid and n-hexatetracontanoic acid.

Aliphatic unsaturated monocarboxylic acid:

2-hexenoic acid, 3-hexenoic acid, 4-hexenoic acid, 5-hexenoic acid, 2-methyl-2-pentenoic acid, 3-methyl-2-pentenoic acid, 4-methyl-2-pentenoic acid, 4-methylpentenoic acid, α-ethylcrotonic acid, 2,2-dimethyl-3-butenoic acid, 2-heptenoic acid, 2-octenoic acid, 4-decenoic acid, 9-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, cis-6-octadecenoic acid, 9-octadecenoic acid, oil acid, elaidic acid, 11-octadecenoic acid, 12-octadecenoic acid, 9-eicosenoic acid, 11-eicosenoic acid, 11-dosenoic acid, 13-docosenoic acid, erucic acid, 15-tetracosenoic acid, and mycolipenic acid.

Aliphatic diolefin carboxylic acid:

2,4-hexadienoic acid, diallylacetic acid, geranium acid, 2,4-decadienoic acid, 2,4-dodecadienoic acid, 9,12-hexadecadienoic acid and 9,12-octadecadienoic acid.

Aliphatic higher unsaturated monocarboxylic acid:

hexadecatrienoic acid, linoleic acid, linolenic acid, 6,9,12-octadecatrienoic acid, eicosadienoic acid, eicosatrienoic acid, docosadienoic acid, docosatrienoic acid, and hexacodienoic acid.

Aliphatic saturated dicarboxylic acid:

adipic acid, pimelic acid, suberic acid, azelaic acid, sebacic acid, undecane dicarboxylic acid, dodecane dicarboxylic acid, brassylic acid, and tetradecane dicarboxylic acid.

Aromatic monocarboxylic acid:

benzoic acid, o-toluylic acid, m-toluylic acid, p-toluylic acid, dimethyl benzoic acid, o-ethylbenzoic acid, m-ethylbenzoic acid, p-ethylbenzoic acid, 2,3,4-trimethylbenzoic acid, 2,3,5-trimethylbenzoic acid, 2,3,6-trimethylbenzoic acid, 2,4,5-trimethylbenzoic acid, 2,4,6-trimethylbenzoic acid, 3,4,5-trimethylbenzoic acid, cuminic acid, cinnamic acid, o-nitrobenzoic acid, m-nitrobenzoic acid, p-nitrobenzoic acid, 2,4-dinitrobenzoic acid, 3,5-dinitrobenzoic acid, O-chlorobenzoic acid, p-chlorobenzoic acid, O-fluorobenzoic acid, m-fluorobenzoic acid, p-fluorobenzoic acid, 0-bromobenzoic acid, m-bromobenzoic acid, p-bromobenzoic acid, 0-iodobenzoic acid, m-iodobenzoic acid, p-iodobenzoic acid, 2,3-dichlorobenzoic acid, 2,5-dichorobenzoic acid, 2,6-dichlorobenzoic acid, 3,4-dichlorobenzoic acid, 3,5-dichlorobenzoic acid, 2,3-dibromobenzoic acid, 2,4-dibromobenzoic acid, 2,5-dibromobenzoic acid, 2,6-dibromobenzoic acid, 3,4-dibromobenzoic acid, 3,5-dibromobenzoic acid, 2,3-diiodobenzoic acid, 2,4-diiodobenzoic acid, 2,5-diiodobenzoic acid, 2,6-diiodobenzoic acid, 3,4-diiodobenzoic acid, 3,5-diiodobenzoic acid, 2-chloro-4-nitrobenzoic acid, 2-chloro-5-nitrobenzoic acid, 3-chloro-6-nitrobenzoic acid, 2-bromo-5-nitrobenzoic acid, 2-chlorocinnamic acid, α-naphthoic acid, 2-cyano-cinnamic acid, 2-naphthoic acid, 5-chloronaphthoic acid, β-naphthoic acid, and 5-bromonaphthoic acid.

Aromatic dicarboxylic acid:

phthalic acid, isophthalic acid, terephthalic acid, 3-chlorophthalic acid, 4-chlorophthalic acid, 3,6-dichlorophthalic acid, tetrachlorophathalic acid, tetrabromophthalic acid, tetraiodophthalic acid, naphthalic acid, naphthalin-1,2-dicarboxylic acid, naphthalin-1,4-dicarboxylic acid and napthalin-1,5-dicarboxylic acid.

Aromatic tricarboxylic acid:

1,2,3-hemimellitic acid and 1,2,4-trimellitic acid. and acid anhydrides of above-mentioned carboxylic acids.

Acidic compounds for emulsion B, i.e., carboxylic acids of alicyclic compounds, include, for example, abietic acid, bisnorchonic acid, β-boswelic acid, chenodesoxycholic acid, quinovic acid, cholanic acid, cholic acid, dehydrocholic acid, dioxycohlic acid, doisynolic acid, erythrochlenic acid, etiocholanic acid, glycocholic acid, glycylrhezic acid, oleanolic acid, helvolic acid, hiodesoxycoalic acid, risocoalic acid, naphthenic acid, norcholanic acid, l-picholic acid, quillaic acid, ursodesoxycholic acid, and ursolic acid.

As for an acidic compound, i.e., a natural resin containing a resin acid, to be employed for the aforesaid emulsion C, such a resin as having an electric resistance of at least $10^{11}\Omega$ cm. is selected lest its special quality should be deteriorated when applied in a photoconductive layer. Natural resins having such a property and considered suitable for application include, for example, elemi, Gurjun balsam, jalap, scammonium, amber, bdellium, sagapenum, Euphorbium, myrrhe, Opopanax, various kinds of dammar (such as benak, dead dammar, melanty, chan, yan panoun, papuan dammar), shellac, acaroid, dragon brad, mustic, styrax, Canada balsam, mecca balsam, copaiba balsam, Peru balsam, guajak, takamahak, galbanum, gamboge, olibanum, opopanax ammoniacum, asafetida, various kinds of kopal (such as kauri kopal, soft manila kopal, hard manila kopal, congo kopal, benguela kopal, angora kopal, madagaskar kopal, zanzibar kopal, demera kopal, hard bornea kopal, New Zealand kauri kopal), various kinds of rosin (such as gum rosin, heterogeneous rosin, polymerized rosin, hydrogenated rosin, tool oil, rosin malate, rosin oxide, hardened rosin, ester gum), benzoin, sandarak, true balsam, and kawa kawa resin.

Acidic compounds for emulsion D, i.e., vinyl copolymers having carboxyl radical and an electric resistance of at least $10^{11}\Omega$ cm., include, for example, styrene-maletic acid-methacrylic acid copolymer, acrylic ester-acrylic acid copolymer, vinyl acetate-crotonic acid copolymer, and styrene-vinylacetate-maleic acid copolymer. That is, acidic compounds for emulsion D are prepared by the combination of various vinyl monomers and unsaturated carboxylic acid such as aliphatic unsaturated monocarboxylic acids or monoesters of aliphatic unsaturated dicarboxylic acids as mentioned hereinbefore. With respect to the acidic compounds for emulsion D, in the present invention, it is not necessary to restrict the degree of polymerization.

In the present invention, as for the water-emulsified resinous binder, vinylmonomers for use in emulsion polymerization as a main component of said binder include, for example, vinyl acetate, vinyl chloride, styrene, acrylic esters and methacrylic esters. These monomers are also provided in the combinations, for example, as follows: a combination containing vinyl acetate such as vinyl acetate-crotonic acid, vinyl acetate-maleic acid, vinyl acetate-vinyl stearate and vinyl acetate alone; a combination containing vinyl chloride such as vinyl chloride-vinyl isobutylether, vinyl chloride-vinylacetate-vinyl alcohol, vinyl chloride-vinyl acetate-maleic acid anhydride and vinyl chloride alone; a combination containing styrene such as styrene-methacrylic acid, styrene-butadiene, styrene-dimethyl itaconate and styrene alone; and a combination containing acrylic ester or methacrylic ester such as acrylic ester-acrylic acid, acrylic ester-methacrylic acid, methacrylic ester-methacrylic acid, methacrylic ester-acrylic acid, styrene-acrylic ester-acrylic acid, styrene-acrylonitrile and any one of said esters. In addition, as for acrylic esters and methacrylic esters it is desirable to select such esters, carboxyl radical of which is combined with a alkyl radical having 1 to 5 carbon atoms.

It is desirable, in emulsion polymerization of the present invention, to combine the aforesaid vinyl monomers and the acidic compounds in the ratio of 0.01–0.1 part by weight of the total amount of the latter per 1 part by weight of the total amount of the former.

The materials of water-emulsified resinous binder to be employed in the present invention are as enumerated above, whereas, as for the materials other than said water-emulsified resinous binder to be employed in forming a photoconductive layer, any such a support, photoconductive substance, and sensitizer as commonly in use may be applicable. As a photoconductive substance, for instance, zinc oxide, titanium oxide, cadmium sulfide, zinc selenide, and so forth may be applicable, and above all, zinc oxide and titanium oxide are desirable.

As for the sensitizer to be employed, Phthalein dyes such as Fluorescein, Eosin, Erythrosine, and Rose Bengal, Triphenylmethane dyes such as Malachite Green, Crystal Violet, Basic Fuchsin, Methyl Green, Brilliant Green, Bromophenol Blue, and Tetrabromophenol Blue, Cyanine dyes such as Cryptocyanine and Pinacyanol, Heterocyclic dyes such as Acridine Orange, mixed dyes such as Methylene Grey, and furthermore, Alizarine Red S Alizarine, and Quinizarin may be cited. A desirable impregnation of the aforesaid sensitizer in photoconductive layer may be attained by mixing the sensitizer within the range of 0.01–5.0 percent per total weight of zinc oxide, for example, to be contained in a photoconductive layer. As for the support, not only a metallic plate but also either paper or sheet film whose back has been processed for electric conductivity may be employed, but the surface electroresistivity resulting from said process for electric conductivity is desirable to be less than $10^9 \Omega$ cm. and it is further advisable to make it less than $10^7 \Omega$ cm.

The photoconductive layer of the copying material in the present invention is formed through a series of steps of coating on one surface of a support, a photoconductive layer forming solution consisting of an emulsion, a photoconductive substance and a sensitizer dispersed therein, by such methods as the centrifugal-coating method, spray-coating method or brush-coating method or a knife-coating method, and then drying the thus coated solution by such methods as hot-air drying method or infrared-ray drying method for the sake of rapid drying. the electric resistance of the photoconductive layer thus obtained is in the range from $10^{12} \Omega$ cm. to $10^{15} \Omega$ cm. or more. Therefore, in case the copying materials of the present invention are developed by the known developing method, those copying materials provide prints which carry well contrasted, clear images.

DESCRIPTION OF THE PREFERRED EMBODIMENTS

EXAMPLE 1

| | |
|---|---|
| ethyl acrylate ester | 45 parts by weight |
| acrylonitrile | 30 parts by weight |
| styrene | 22 parts by weight |
| acrylic ester | 3 parts by weight |
| oleic acid | 4 parts by weight |
| salt of dodecylbenzene sulfonic acid and triethanolamine | 0.1 part by weight |
| were added to | 150 parts by weight | of water. The resulting mixed solution was transferred into a 2-l reaction flask equipped with stirrer, reflux condenser, entrance of raw material and thermometer. Then, the flask was dipped in a water bath and thereafter the mixture contained in the flask was subjected to emulsion polymerization reaction in a nitrogen gas atmosphere at 65°–70° C. by gradually heating the aforesaid water bath. While retaining this temperature range, a total of 0.3 part by weight of ammonium persulfate was added to the resulting reaction mixture in the three divided dosages on an hourly basis at intervals of 1 hour. When the reaction mixture was allowed for emulsion polymerization reaction for 7 hours, after the reaction had been started, the water-emulsified resinous binder having 39.5 percent by weight of a solid matter emulsified therein and pH value of 2.5 was obtained.

To 100 g. of photoconductive zinc oxide was added 100 g. of water. Then, 5 cc. of sensitizer methanol solution (which contains 1 percent Bromophenol Blue, 0.5 percent of Fluorescein, and 0.1 percent of Rose Bengal), said mixture and 65 g. of aforesaid water-emulsified resinous binder were mixed in a homomixer, and thus, a photoconductive layer forming solution was obtained.

The solution thus obtained was applied onto one surface of an art paper, whose back surface had been already given an electroconductive treatment, to such an extent that the weight after drying process may be 25 g./m.², upon drying said coated support, an electrophotographic copying material was obtained.

On the other hand, for the purpose of comparing the efficiency and performance of the copying material of the present invention, a water-emulsified resinous binder solution having quite the same composition as that of the aforesaid binder solution, except the for substitution of the surface-active agent sodium salt of alkylbenzene sulfonic acid for the oleic acid was prepared by emulsion polymerization and the same sensitizer solution as in the present invention described in the foregoing was added thereto, and the thus blended solution was further processed in the same way as in the present invention, thereby producing a copying material to serve for said comparison.

When both of the aforesaid copying materials were impressed with electric charge through an ordinary process, exposed, and then developed by either wet-process or dry-process, the copying material which was produced in accordance with the present invention formed a clear image, whether developed by wet-process or dry-process, while the other one employed for comparison could hardly form any image regardless of the process of development.

EXAMPLE 2

| | |
|---|---|
| butyl acrylate | 30 parts by weight |
| vinyl propionate | 30 parts by weight |
| methyl methacrylate | 35 parts by weight |
| acrylic acid | 5 parts by weight |
| lauric acid | 5 parts by weight |
| salt of triethanolamine and dodecylbenzenesulfonate | 0.1 part by weight |
| ammonium persulfate | 0.2 part by weight |
| were added to | 150 parts by weight of water, | and said mixture which had been prepared by dissolving acrylic acid in the remainder of said materials was transferred into a reaction flask (the same flask as in Example 1). Then the solution of said mixture was subjected to emulsion polymerization at 65°–70° C. for 8 hours, and thus, a water-emulsified resinous binder having 40.2 percent by weight of solid matter and pH value of 2.8 was obtained.

The said emulsion was thereafter processed, in a manner similar to that described in Example 1, and thus, an electrophotographic copying material was obtained. The efficiency and performance of thus obtained copying material were equivalent to that of Example 1 of the present invention.

EXAMPLE 3

Using a reaction flask similar to that described in Example 1, and by following the reaction process similar to that described in Example 2, a mixed solution containing 40 parts by weight of ethylacrylate, 55 parts by weight of styrene, 5 parts by weight of acrylic acid, 3 parts by weight of linolic acid, 0.1 part by weight of sodium benzenesulfonate, 0.3 part by weight of ammonium persulfate and 150 parts by weight of water was subjected to emulsion polymerization. Thus a water-emulsified resinous binder having 39.5 percent by weight of a solid matter and pH value of 2.5 was obtained.

The said emulsion was thereafter processed, in a manner similar to that described in Example 1, and thus an electrophotographic copying material was obtained. The efficiency and performance of thus obtained copying material were equivalent to that of Example 1 of the present invention.

EXAMPLE 4

To a mixed solution containing 40 parts by weight of ethylacrylate, 55 parts by weight of styrene, 5 parts by weight of acrylic acid, 0.3 part by weight of ammonium persulfate and 150 parts by weight of water was added 3 parts by weight of stearic acid and 0.08 part by weight of sodium lauryl sulfate (This solution is hereinafter referred to as solution A.) On the other hand, another solution was prepared by means of dissolving a 3 parts by weight of margaric acid and 0.08 part by weight of sodium lauryl sulfate into a solution consisting of the same composition as mentioned above. (This solution is hereinafter referred to as solution B.) Subsequently, each solution thus obtained was respectively transferred into two reaction flasks i.e., the same as employed in Example 1 ), then subjected to emulsion polymerization for 8 hours, and thus, water-emulsified resinous binders were prepared.

It was confirmed that the resinous binder obtained from said solution A has a composition of 40.1 percent by weight of a solid matter and pH value of 2.5, on the other hand, the resinous binder obtained from said solution B has a composition of 40.5 percent by weight of a solid matter and pH value of 2.6.

The said emulsion was thereafter processed, in a manner similar to that described in Example 1, and thus, an electro photographic copying material was obtained. The efficiency and performance of thus obtained copying material were equivalent to that of Example 1 of the present invention.

EXAMPLE 5

To a mixed solution containing 30 parts by weight of butyl acrylate, 30 parts by weight of methylmethacrylate, 35 parts by weight of styrene, 5 parts by weight of acrylic acid, 0.1 part by weight of a salt of triethanolamine and dodecylbenzene sulfonate, 0.3 part of weight of ammonium persulfate and 150 parts by weight of water was dissolved 3 parts by weight of lauric acid anhydride. The solution thus prepared was transferred into a reaction flask (the same flask as in Example 1 ) and was subjected to emulsion polymerization. Thus a water-emulsified resinous binder having 40.0 percent by weight of a solid matter and pH value of 2.5 was obtained.

The said emulsion was thereafter processed, in a manner similar to that described in Example 1, and thus, an electrophotographic copying material was obtained. The efficiency and performance of thus obtained copying material were equivalent to that of example 1 of the present invention.

EXAMPLE 6

The same result was obtained, as that in Example 1, by employing a water-emulsified resinous binder, which has 40.2 percent by weight of solid matter, pH value of 2.4 and a composition as mentioned below, in lieu of a resinous binder employed in Example 1.

Namely, a composition of said resinous binder was composed, by emulsion polymerization at 65°–80° C. for 7 hours of 20 parts by weight of ethylhexylacrylate, 65 parts by weight of ethylmethacrylate, 5 parts by weight of acrylic acid, 4.5 parts by weight of phthalic acid anhydride, 0.1 part by weight of dialkylsulfosuccinate, 0.3 part by weight of ammonium persulfate and 150 parts by weight of water.

EXAMPLE 7

A preparation of a water-emulsified resinous binder

Three reaction flasks (2 -L. capacity), which were equipped with stirrer, reflux condenser, entrance of raw material and thermometer, respectively were placed on a water bath. Then, mixed solutions of the following raw materials A, B and C were introduced in each of said reaction flasks, respectively, and air within said flasks replaced with nitrogen gas.

A mixed solution A consisting of:
| | |
|---|---|
| vinyl acetate | 70 parts by weight |
| styrene | 15 parts by weight |
| crotonic acid | 2 parts by weight |
| abietic acid | 13 parts by weight |
| sodium dodecylbenzene-sulfonate | 0.08 part by weight |
| ammonium persulfate | 0.3 parts by weight |
| water | 150 parts by weight | was subjected to emulsion polymerization at 60°C. for 6 hours, and thus, an o/w type water-emulsified resinous binder having about 40 percent by weight of a solid matter was obtained.

A mixed solution B consisting of:
| | |
|---|---|
| butyl acrylate | 50 parts by weight |
| styrene | 45 parts by weight |
| acrylic acid | 2 parts by weight |
| naphthenic acid | 3 parts by weight |
| dialkylsulfosuccinate | 0.1 part by weight |
| ammonium persulfate | 0.2 part by weight |
| water | 150 parts by weight |

According to the emulsion polymerization process similar to that described in aforesaid A, an o/w type water-emulsified resinous binder having about 40 percent by weight of a solid matter was obtained from said solution B.

A mixed solution C consisting of:
| | |
|---|---|
| vinylidene chloride | 20 parts by weight |
| ethylacrylate | 70 parts by weight |
| maleic acid | 5 parts by weight |
| cholanic acid | 5 parts by weight |
| sodium dodecylbenzene-sulfonate | 0.07 part by weight |
| ammonium persulfate | 0.3 part by weight |
| water | 150 parts by weight |

According to the emulsion polymerization process similar to that described in aforesaid A, an o/w type water-emulsified resinous binder having about 40 percent by weight of a solid matter was obtained from said solution C.

A preparation of photoconductive layer forming solutions

To the respective water-emulsified resinous binder obtained from aforesaid A, B, and C solution were dispersed by mixing a photoconductive substance, a sensitizer and water in a homomixer for 10–15 minutes. Thus, the three kinds of dispersions, i.e., photoconductive layer forming solutions composed with the following compositions a, b and c were obtained.

a dispersion:
| | |
|---|---|
| zinc oxide | 100 g. |
| aforesaid water-emulsified resinous binder obtained from the solution (A) | 50 g. |
| a sensitizer (which is a methanol solution of 1% by weight of Bromophenol Blue and 0.2% by weight of Rose Bengul) | 3 cc. |
| water | 60 g. | b dispersion:
| | |
|---|---|
| zinc oxide | 100 g. |
| aforesaid water-emulsified resinous binder obtained from the solution (B) | 50 g. |
| a sensitizer (the same as employed in aforesaid (a) dispersion) | 3 cc. |
| water | 70 g. | c dispersion:
| | |
|---|---|
| zinc oxide | 100 g. |
| aforesaid water-emulsified resinous binder obtained from the solution (C) | 50 g. |
| a sensitizer (the same as employed in aforesaid (a) dispersion) | 3 cc. |
| water | 60 g. |

Preparation of copying materials

The aforesaid dispersion a was applied to one surface of an art paper, whose back surface has been processed for electroconductive treatment and regulated to a surface electric resistance of $10^9 \Omega$ cm., and was then dried at 130° C. for 2 minutes. Thus an electrophotographic copying material a' was obtained.

The aforesaid dispersion b was applied to one surface of an alminum plate, and was then dried at 130° C. for 5 minutes, and thus, an electrophotographic copying material b was obtained.

Also, the aforesaid dispersion c was applied to one surface on a tracing paper, whose back surface has been processed for electroconductive treatment, and thereafter was dried, and thus, an electrophotographic copying material c' was obtained.

Preparation of copying materials for comparing the efficiency and performance

In the first place, there was prepared a resinous emulsion D which has the same composition, in respect of the raw materials, as the aforesaid resinous emulsion A, except that abietic acid was omitted from the composite materials of the former while the quantity of sodium dodecyl benzenesulfonic acid was increased up to 3.0 parts by weight thereof. Next, there was prepared a resinous emulsion E which has the same composition in respect of the raw materials, as the aforesaid resinous emulsion B, except that naphthenic acid was omitted from the composite materials of the former while the quantity of dialkylsulfosuccinate was increased up to 3.0 parts by weight thereof. Furthermore, there was prepared a resinous emulsion F which has the same composition, in respect of the raw materials, as the aforesaid resinous emulsion C, except that cholanic acid was omitted from the composite materials of the former while the quantity of sodium dodecyl benzenesulfonic acid was increased up to 3.0 parts by weight thereof.

Said resinous emulsions D, E and F thus prepared were treated in the same way as in case of producing the aforesaid electrophotographic copying materials $a'$, $b'$ and $c'$, and thereby were prepared copying materials $a''$, $b''$ and $c''$, respectively.

Comparison of the efficiency and performance of copying materials:

The copying materials $a'$, $b'$ and $c'$ according to the present invention and the copying materials $a''$, $b''$ and $c''$ prepared for the purpose of comparison were respectively impressed with electric charge by means of 6KV- corona discharge to evaluate saturated electric potencial (Vs), electric potential at the time of the maximum charge (VM), and electric potential when said copying materials were left intact for 30 seconds after stopping the impression of electric charge thereon (Vo). Moreover, said materials were practically employed for image-making to examine and evaluate the sharpness and concentration of the image formed thereby. The results thus obtained were shown in Table 1.

EXAMPLE 9

Preparation of a resinous emulsion

A glass flask (2-ti L. capacity), which was equipped with stirrer, reflex condenser, entrance of raw material and thermometer, was placed in a water bath. Then, a mixed solution consisting of 30 parts by weight of acrylic ethyl ester, 70 parts by weight of methyl ester methacrylate, 5 parts by weight of methacrylic acid, 4 parts by weight of dammar, 0.1 part by weight of triethanolamine salt of dodecyl benzenesulfonic acid and 150 parts by weight of water was introduced into said flask, and after replacing the air within the flask with nitrogen gas, the temperature of said bath was gradually raided until the temperature within the flask came up to the range of 65°–70 C.

Subsequently, 0.3 gr. of ammonium persulfate was divided into three doses and each dose was introduced into the flask at intervals of one hour lest the temperature of reaction should deviate from the aforesaid range of temperature, and the mixture was further stirred up for some time. Thus, after 6-hour polymerization, there was obtained a water-emulsified resinous binder comprising 39.7 percent of solid matter and a pH value of 2.8.

Preparation of the photoconductive layer forming solution

To 100 g. of photoconductive zinc oxide was added 100 g. of water and said substances were mixed by homomixer, and then 5 cc. of sensitizing dye solution (a methanol solution comprising 1 percent of Bromophenol Blue, 0.5 percent of fluorescein and 1 percent of Rose Bengul) was added to the mixture, and thereby was prepared zinc oxide dispersion (hereinafter referred to as photosensitive material solution). Subsequently, 60 g. of the aforesaid water-emulsified resinous binder was added to this photosensitive material solution and stirred up, and thereby was obtained a dispersion to be employed in forming photoconductive layer.

Preparation of copying materials

The aforesaid photoconductive layer forming solutions was coated onto the surface of an art paper, whose back had been

TABLE 1

| Copying material | VM (−V/M) | Vs (−V/M) | Vo (−V/M) | Ratio of dark-decay [1] (percent) | Concentration and sharpness of copied image [2] |
|---|---|---|---|---|---|
| Material of the present invention: | | | | | |
| ($a'$) | 40 | 40 | 32 | 20 | Clear-cut (1.0). |
| ($b'$) | 38 | 38 | 30 | 21 | Do. |
| ($c'$) | 42 | 42 | 35 | 16.5 | Do. |
| Materials for comparison: | | | | | |
| ($a''$) | 10 | 10 | 0 | 100 | No image formed. |
| ($b''$) | 11 | 11 | 3 | 73 | Do. |
| ($c''$) | 13 | 13 | 2 | 84.6 | Do. |

[1] Ratio of dark-decay (percent) $=\frac{Vs-Vo}{Vs}\times 100$

[2] Concentration of image is indicated by reflection concentration log DR, and was measured by using a reflection densitometer.

EXAMPLE 8

There was prepared a water-emulsified resinous binder which has the same composition, in respect of the raw materials, as the emulsion A in the foregoing Example 7, except that triethanolamine salt of alkyl benzenesulfonic acid was employed in the former instead of dodecyl benzenesulfonic acid employed for the latter emulsion A. A water-emulsified resinous binder thus prepared was processed in the same way as in Example 7 and thereby was obtained an electrophotographic copying material. The copying material thus obtained has proved further superior to the one which was obtained in Example 7 of the present invention in respect of the efficiency and performance in actual copying.

processed for electric conductivity, to the extent that the weight of the coated paper after the drying process subsequent thereto would be 25 g./m² and then was dried, whereby producing an electrophotographic copying material.

Meanwhile, for the sake of comparing the efficiency and performance of copying materials, at the time of preparation of the aforesaid resinous binder, a known surface-active agent available in the market was employed as the emulsifier in lieu of dammar, and a resinous binder thus obtained was processed in the same way as in the present invention, and thereby was produced a copying material to be used for comparison.

The copying materials thus prepared were respectively employed for copying purpose in accordance with the known electrophotographic copying method and were developed by both the wet-process and dry-process. As a result, the copying material in the present invention showed a clear copied image in either case of the wet-process development and dry-process development, whereas the other copying material used for comparison failed in image-making in either case.

EXAMPLE 10

Preparation of Water-Emulsified Resinous Binder

There was employed the same reaction flask as that in Example 9, and into said flask was introduced the raw material comprising 20 parts by weight of acrylic diethyl hexylester, 65 parts by weight of styrene, 10 parts by weight of methylester methacrylate, 5 parts by weight of acrylic acid, 3 parts by weight of kauri copal, 0.1 part by weight of dialkyl sulfosuccinate, 0.2 parts be weight of ammonium persulfate, and 150 parts by weight of water in the same way as in Example 9, providing that said kauri copal be thoroughly dissolved into said monomer solution in advance. Said raw material thus introduced into the flask was polymerized at the reaction temperature of 70°C. for a period of 7 hours, and thereby was obtained a water-emulsified resinous binder comprising 41 percent of solid matter and having a pH value of 2.6.

Preparation of the photoconductive layer forming solution

A solution having the same composition as the photosensitive material solution in Example 9 was prepared. Then, 65 g. of the aforesaid resinous binder was added to said solution and stirred up, and thereby was obtained a dispersion to be employed in forming photoconductive layer.

Preparation of copying materials

The aforesaid photoconductive layer forming solution was processed in the same way as in Example 9, and the resultant electrophotographic copying material showed a copying efficiency and performance equivalent to that of the copying material in Example 9 of the present invention.

Example 11

There was employed the same reaction flask as that in Example 9, and into said flask was introduced the raw material comprising 45 parts by weight of acrylic ethyl ester, 30 parts by weight of acrylonitrile, 20 parts by weight of styrene, 5 parts by weight of acrylic acid, 4 parts by weight of disproportionated rosin, 0.08 parts of triethanolamine salt of dodecyl benzenesulfonic acid, 0.2 parts by weight of ammonium persulfate and 150 parts by weight of water, providing that said disproportionated resin be thoroughly dissolved into a monomer solution in advance. Said raw material thus introduced into the flask was polymerized at the reaction temperature of 70° C. for a period of 7 hours, and thereby was obtained a water-emulsified resinous binder containing 41.5 percent of solid matter and having a pH value of 2.6.

The resinous binder thus obtained, when processed in the same way as in Example 10, brought about a superb efficiency and performance as in case of Example 10.

EXAMPLE 12

There was employed the same reaction flask as that in Example 9, and into said flask was introduced the raw material comprising 30 parts by weight of acrylic butyl ester, 30 parts by weight of vinyl propionic acid, 35 parts by weight of methyl ester methacrylate, 5 parts by weight of acrylic acid, 5 parts by weight of Canada balsam, 0.1 part by weight of triethanolamine salt of dodecyl benzenesulfonic acid, 0.2 part by weight of ammonium persulfate and 150 parts by weight of water, providing that said Canada balsam be thoroughly dissolved into a monomer solution in advance. Said raw material thus introduced into the flask was polymerized at the reaction temperature of 65°–70° C. for a period of 8 hours, and thereby was obtained a water-emulsified resinous binder comprising 40.6 percent of solid matter and having a pH value of 2.3.

The resinous binder thus obtained, when employed in lieu of the resinous emulsion of Example 9, the image-making performance was as superb as that in Example 9.

EXAMPLE 13

A glass flask (2L. capacity), which was equipped with stirrer, counterflow cooler, entrance of raw material and thermometer, was placed in a warm-water bath. Then, the raw material consisting of:

| | |
|---|---|
| styrene | 50 parts by weight |
| acrylic butyl ester | 30 parts by weight |
| ethyl ester methacrylate | 10 parts by weight |
| copolymer of styrene-maleic acid (molar fraction of styrene/maleic acid: 9) | 10 parts by weight |
| ) sodium dodecyl benzenesulfonic acid | 0.1 part by weight |
| ammonium persulfate | 0.3 part by weight |
| water | 150 parts by weight | was introduced into said flask, and after replacing the air within the flask with nitrogen gas, said raw material was processed for emulsion polymerization, and thereby was prepared a water-emulsified resinous binder.

To 50 g. of thus obtained resinous binder was added 100 g. of photoconductive zinc oxide, 60 g. of water and 3 cc. of sensitizing dye (a methanol solution comprising 1 percent of Bromo phenol Blue and 0.3 percent of Rose Bengal), and the mixture was stirred up for thorough dispersion. Next, the dispersion thus prepared was coated onto the surface of an art paper, whose back had been processed for electric conductivity and dried at 120° C. for 3 minutes, and thereby was obtained an electrophotographic copying material. The photoconductive layer surface of the copying material thus obtained, when impressed with electric charge by corona discharge (−6 kv.), showed a saturated electric potential of −40 v./μ, and, when left in a dark place upon stopping the impression of electric charge, the damping factor of electric potential, i.e., the dark-decay was conspicuously small.

Also, said copying material, when practically used for image copying, formed a very clear image.

For the sake of comparing the efficiency and performance of copying materials, another copying material was prepared by employing a resinous binder—which has the same composition, in respect of the raw material, as the aforesaid resinous binder except that only the copolymer of styrene-maleic acid was omitted therefrom—and by processing it in the same way as in the present invention. The copying material thus prepared for comparison purpose, when impressed with electric charge, proved that its saturated electric potential was markedly lower, while the degree of the dark-decay was much higher, than that of the one in the present invention. Not only that, its efficiency and performance in practical image formation was very unsatisfactory.

It was further found that in proportion to the increase in the quantity of sodium dodecylbenzene sulfonic acid contained in the resinous emulsion which was employed for the copying material prepared for the sake of comparison, the electrostatic characteristics thereof as stated above were degraded.

EXAMPLE 14

In lieu of a copolymer of styrene-maleic acid contained in the material composition of the resinous binder in Example 13, a copylymer of acrylic acid-ethyl acrylate (molar ratio of ethyl acrylate/acrylic acid: 19) was employed and processed for emulsion polymerization in the same way as in Example 13. The resinous binder thus processed was employed as a photoconductive layer forming solution, thereby forming a photoconductive layer containing the same photosensitive materials as that of Example 13 on the surface of a support, and thus was obtained an electrophotographic copying material. The copying efficiency and performance as well as the electrostatic characteristics of said copying material were substantially equivalent to that of the one in Example 13 of the present invention.

EXAMPLE 15

The raw material consisting of:

| | |
|---|---|
| vinyl acetate | 60 parts by weight |
| styrene | 20 parts by weight |
| butyl methacrylate | 10 parts by weight |
| copolymer of vinyl acetate-crotonic acid | 10 parts by weight |
| triethylamine slat of alkyl benzenesulfonic acid | 0.3 part by weight |
| ammonium persulfate | 0.3 part by weight |
| water | 150 parts by weight | was processed in the same way as in Example 13, and thereby was prepared a water-emulsified resinous binder. To 50 g. of said resinous binder was added 100 g. of zinc oxide, 70 g. water and 4 cc. of sensitizing dye (the same one as that in Example 13 ) and stirred up for thorough dispersion. As for the rest, the same processes as in Example 13 were followed, and thereby was obtained an electrophotographic copying material. The copying material thus obtained, when impressed with electric charge, showed a saturated electric potential of −45 v./μ, and the degree of its dark-decay was low. Moreover, it was determined that said copying material is capable of forming a copied image of high concentration.

Meanwhile, for the sake of comparing the efficiency and performance of copying materials, by employing other resinous binders which are available in the market (i.e., emulsified compounds comprising, for instance, a copolymer of styrenebutadiene, a polymer of vinyl acetate-vinyl chroride, an acrylic polymer, a polymer of vinyl acetate, and the like) and processing them in the same way as in the present invention, and thereby were obtained copying materials to be employed for said comparison. These copying materials thus prepared, however, showed saturated electric potentials ranging from 0 to −20 v./μ, and even such ones that showed a saturated electric potential of −20 v./μ when put to practical use for copying, failed in forming any image because of the degree of their dark-decay being too high.

For the sake of further comparison of the efficiency and performance of copying materials, by employing respective polymeric monomers of vinyl acetate, styrene, and methyl methacrylate, and adding thereto whichever compound among sodium dodecyl benzenesulfonic acid, dodecyl sodium sulfate, or dialkylsulfosuccinate individually, and then processing the mixture for emulsion polymerization in the same way as in the foregoing, there were prepared a variety of resinous binders. Subsequently, by processing these resinous binders in the same way as in the present invention, a variety of copying materials were prepared for use in the aforesaid comparison. However, the electric resistance of the photoconductive layer of any of these copying materials was less than $10^{13}$ Ωcm. and the saturated electric potential thereof, when impressed with electric charge, was low, and, as a result, any of said materials, when put to practical use for copying, could not form any image.

What is claimed is:

1. A process for preparing an electrophotographic copying material comprising an electroconductive support having a photoconductive layer on one surface thereof, comprising the steps of:

preparing a water-emulsified resinous binder by subjecting to emulsion polymerization a reaction mixture consisting essentially of water having dispersed or dissolved therein 1. at least one vinyl monomer selected from the group consisting of vinyl acetate, vinyl chloride, styrene, acrylic esters and methacrylic esters, 2. at least one monomer selected from the group consisting of vinyl propionate, vinylidene chloride, crotonic acid, maleic acid and its anhydride, vinyl stearate, vinyl isobutylether, vinyl alcohol, methacrylic acid, butadiene, dimethyl itaconate, acrylic acid and acylonitrile, 3. at least one acidic compound selected from the group consisting of aliphatic carboxylic acids, aromatic carboxylic acids, acid anhydrides of said carboxylic acids, alicyclic compounds having a carboxyl radical, natural resins having resin acid and an electric resistance of at least $10^{11}$ Ωcm. and vinyl polymers having carboxyl radical and an electric resistance of at least $10^{11}$ Ωcm., the amount of said acidic compound contained in said reaction mixture being in the range of from about 0.01 to 0.1 part by weight per 1 part by weight of said monomers, and 4. a surface-active agent selected from the group consisting of alkylbenzene sulfonic acid-triethanolamine salt, sodium benzene sulfonate, sodium lauryl sulfate, dialkylsulfosuccinate and sodium dodecylbenzenesulfonate, the amount of said surface-active agent being in the range of from 0.05 to 0.1 percent by weight of the total amount of the monomers contained in said reaction mixture; dispersing an inorganic photoconductive substance into the reaction product of said emulsion polymerization and consisting of said water-emulsified resinous binder;

coating the resultant dispersion onto one surface of a support; and then drying the coated dispersion thereby forming a photoconductive layer on said support.

2. A process according to claim 2, wherein said vinyl polymers having carboxyl radical are copolymers prepared by polymerizing at least one vinyl monomer and at least one unsaturated carboxylic acid selected from the group consisting of aliphatic unsaturated monocarboxylic acids and monoesters of aliphatic unsaturated dicarboxylic acids.

3. A process according to claim 1, wherein said natural resins having resin acid are selected from the group consisting of elemi, gurjun balsam, jalap, scammonia, amber, bdellium, sagapenum, euphorbium, myrrh, opopanax, shellac, acaroid, dragon brad, mustic, styrax, Canada balsam, becca balsam, copaiba balsam, Peru balsam, guaiac, tacamahac, galvanum, gamboge, olibanum, ammoniac, asfetida, copals, sandarack, true balsam and kawakawa resin.

* * * * *